(12) United States Patent
Nishiyama et al.

(10) Patent No.: US 8,830,803 B2
(45) Date of Patent: Sep. 9, 2014

(54) OPTICAL DRIVE DEVICE

(75) Inventors: Tetsuya Nishiyama, Tokyo (JP); Takashi Kikukawa, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 12/853,523

(22) Filed: Aug. 10, 2010

(65) Prior Publication Data

US 2011/0128833 A1    Jun. 2, 2011

(30) Foreign Application Priority Data

Aug. 10, 2009    (JP) .................................. 2009-185886
May 31, 2010    (JP) .................................. 2010-124643

(51) Int. Cl.
| | | |
|---|---|---|
| G11B 7/00 | (2006.01) | |
| G11B 27/36 | (2006.01) | |
| G11B 20/10 | (2006.01) | |
| G11B 7/09 | (2006.01) | |
| G11B 7/085 | (2006.01) | |
| G11B 7/095 | (2006.01) | |

(52) U.S. Cl.
CPC ........ *G11B 7/0906* (2013.01); *G11B 20/10527* (2013.01); *G11B 7/08511* (2013.01); *G11B 2007/0013* (2013.01); *G11B 7/0956* (2013.01); *G11B 7/0903* (2013.01); *G11B 20/10009* (2013.01)
USPC .................. 369/53.16; 369/53.22; 369/53.23; 369/53.27; 369/44.25; 369/44.32

(58) Field of Classification Search
USPC .......... 369/53.16, 53.22, 53.23, 53.27, 44.25, 369/44.32
See application file for complete search history.

(56) References Cited

U.S. PATENT DOCUMENTS

| | | |
|---|---|---|
| 5,136,567 A | 8/1992 | Nagahara et al. |
| 6,747,922 B2 | 6/2004 | Kamiyama |
| 2002/0024898 A1 | 2/2002 | Kamiyama |
| 2005/0052960 A1* | 3/2005 | Park et al. .................. 369/44.25 |

(Continued)

FOREIGN PATENT DOCUMENTS

| | | |
|---|---|---|
| JP | 2002-074687 | 3/2002 |
| JP | 2005-092992 | 4/2005 |

(Continued)

OTHER PUBLICATIONS

Extended European Search Report issued in European Patent Application No. 10008341.9, dated Oct. 20, 2011.

(Continued)

*Primary Examiner* — Srilakshmi K Kumar
*Assistant Examiner* — Carl Adams
(74) *Attorney, Agent, or Firm* — McDermott Will & Emery LLP

(57) ABSTRACT

An optical drive apparatus that reproduces an optical disk having a land and a groove, the optical drive apparatus including a first tracking-error-signal generating unit that generates a first tracking error signal by using a DPD method, a second tracking-error-signal generating unit that generates a second tracking error signal by using a DPP method, a tracking servo unit that controls the optical system, and a determining unit that determines that an irradiation point of an optical beam is in a non-recorded area. The tracking servo unit switches over to a control based on the second tracking error signal in response to a result of determination by the determining unit during performing a control based on the first tracking error signal.

7 Claims, 12 Drawing Sheets

(56) References Cited

U.S. PATENT DOCUMENTS

| | | |
|---|---|---|
| 2005/0226108 A1 | 10/2005 | Ichimura |
| 2007/0076546 A1* | 4/2007 | Shimizu et al. ............ 369/44.29 |
| 2008/0080345 A1* | 4/2008 | Hasegawa ................... 369/53.2 |
| 2008/0205245 A1* | 8/2008 | Matsubara et al. ...... 369/112.04 |

FOREIGN PATENT DOCUMENTS

| | | |
|---|---|---|
| JP | 2005-293637 | 10/2005 |
| JP | 2006-004579 | 1/2006 |
| JP | 2006-107612 | 4/2006 |
| JP | 2007-213804 | 8/2007 |
| JP | 2009-087420 | 4/2009 |
| WO | WO 2004/105002 A1 | 12/2004 |

OTHER PUBLICATIONS

English translation of Japanese Office Action issued in Japanese Patent Application No. 2010-124643, mailed Jul. 27, 2010.

English translation of Japanese Office Action issued in Japanese Patent Application No. 2009-185886, mailed Feb. 2, 2010.

* cited by examiner

OPTICAL DRIVE DEVICE

TECHNICAL FIELD

The present invention relates to an optical drive apparatus, and more particularly relates to an optical drive apparatus that performs tracking servo.

BACKGROUND OF THE INVENTION

Practical methods of performing tracking servo for an optical disk include a differential push-pull (DPP) method and a differential phase detection (DPD) method. The DPP method uses a diffraction at a boundary between a land and a groove formed on a surface of an optical disk, in which an optical beam can be focused on a center of the land or the groove. Meanwhile, the DPD method uses a diffraction by a code (a pit or a recording mark) recorded on a recording layer, in which an optical beam can be focused on a center of a code string.

In the DPP method, an offset is generated due to a lens shift of an objective lens. Therefore, a three beam method is employed to cancel the offset by dividing the optical beam into three beams including a zeroth-order diffracted light and ±(plus-minus) first-order diffracted lights. Meanwhile, in the DPD method, a control is performed by detecting a phase difference between signals. Therefore, the offset caused by the lens shift of the objective lens gives substantially no problems, and a single beam method is employed for the DPD method.

When reproducing a ROM or a recorded optical disk, because a code is already recorded on a recording layer, it is possible to perform tracking servo by the DPD method at least in a recorded area (see, for example, Japanese Patent Application Laid-open No. 2005-293637 and Japanese Patent Application Laid-open No. 2002-74687, hereinafter, "Patent Document 1" and "Patent Document 2", respectively). However, because the DPD method cannot be used in a non-recorded area and an irradiation point may come into a non-recorded area when reproducing a disk, the DPP method is conventionally used when reproducing an optical disk having a land and a groove.

SUMMARY OF THE INVENTION

However, the DPP method has a problem that it is strongly affected by a stray light (that is, a reflected light reflected from a surface other than a recording surface, which includes a reflected light reflected from a layer other than an access layer when the optical disk is a multilayer disk). This problem is caused because the ±first-order diffracted lights having relatively weak intensities are used as signal lights. On the other hand, the DPD method, which does not use the ±first-order diffracted lights, is not susceptible to a stray light. Therefore, it is preferable to use the DPD method as much as possible. Accordingly, it is desired to use the DPD method in principle, and to switch over to the DPP method when an irradiation point of an optical beam comes into a non-recorded area.

In Patent Documents 1 and 2, techniques of using the DPD method in a recorded area and the DPP method in a non-recorded area are described.

However, because the techniques described in Patent Document 1 and 2 are techniques for using the DPP method at the time of a track jump into a non-recorded area, even if the irradiation point of the optical beam comes into a non-recorded area when reproducing the disk while maintaining an on-track state (a state of tracking servo on, in which an optical beam is controlled to be focused on a center of a track) upon performing the tracking servo by the DPD method, the control is not switched to the DPP method, and generation of a tracking error signal by the DPD method is continued. Therefore, there can be a case where the on-track state cannot be maintained. This case is explained below in detail.

The technique described in paragraph [0009] of Patent Document 1 is to switch the DPD method and the DPP method based on a magnitude of an amplitude of a tracking error signal at the time of a track jump. Therefore, the DPD method and the DPP method can be switched over only at the time of the track jump, and in the on-track state in which no amplitude is basically generated in the tracking error signal, it is not possible to switch over the DPD method and the DPP method.

The technique described in paragraph [0011] and FIG. 5 of Patent Document 2 determines whether an irradiation point of an optical beam comes into a non-recorded area by referring to edit information (information stored in response to recording or deletion of data) recorded in a specific area of an optical disk when performing a track jump, and switches over the DPD method and the DPP method based on a result of determination. However, there is no description on a switching between the DPD method and the DPP method in the on-track state.

Therefore, an object of the present invention is to provide an optical drive apparatus that can switch over to a tracking servo by the DPP method upon an irradiation point of an optical beam coming into a non-recorded area when reproducing a disk while maintaining an on-track state by performing tracking servo by the DPD method.

Further, when the optical disk is a multilayer disk, because a reflected light reflected from a layer other than an access layer is included in a stray light, the intensity of the stray light becomes particularly strong as compared to a case of a single layer disk, so that a complicated measure against the stray light is required in the DPP method that uses ±first-order diffracted lights.

Therefore, another object of the present invention is to provide an optical drive apparatus that does not require any complicated measure against a stray light in a tracking servo of a multilayer disk that has a land and a groove.

An optical drive apparatus according to the present invention to achieve the above object is an optical drive apparatus that reproduces an optical disk having a land and a groove and includes an optical system for irradiating a recording surface of the optical disk with an optical beam; an optical detector that receives a reflected light of the optical beam reflected from the recording surface; a first tracking-error-signal generating unit that generates a first tracking error signal by using a DPD method, based on a light receiving amount of the optical detector; a second tracking-error-signal generating unit that generates a second tracking error signal by using a DPP method, based on the light receiving amount of the optical detector; a tracking servo unit that controls the optical system based on either one of the first and second tracking error signals; and a determining unit that determines that an irradiation point of the optical beam is in a non-recorded area, and the tracking servo unit switches over to a control based on the second tracking error signal in response to a result of determination by the determining unit during performing a control based on the first tracking error signal.

According to the present invention, it is possible to switch over to a tracking servo by the DPP method upon the irradiation point of the optical beam coming into a non-recorded area when reproducing a disk while maintaining the on-track state by performing the tracking servo by the DPD method.

In the above-mentioned optical drive, the determining unit may determine that an irradiation point of the optical beam is in a non-recorded area in response to whether the second tracking error signal changes beyond a first predetermined range. Accordingly, it is possible to determine in an appropriate manner that the irradiation point of the optical beam comes into a non-recorded area.

In the above-mentioned optical drive, the tracking servo unit may switch over to a control based on the second tracking error signal when the determining unit determines that an irradiation point of the optical beam is in the non-recorded area during performing a control based on the first tracking error signal, and may switch over to the control based on the first tracking error signal in response to whether the second tracking error signal is within a second predetermined range that is narrower than the first predetermined range during performing the control based on the second tracking error signal. Also, the above-mentioned optical drive apparatus may further include an RF signal generating unit that generates an RF signal based on the light receiving amount of the optical detector, and the determining unit may determine that an irradiation point of the optical beam is in a recorded area based on the RF signal, and the tracking servo unit may switch over to a control based on the second tracking error signal when the determining unit determines that the irradiation point of the optical beam is in the non-recorded area during performing a control based on the first tracking error signal, and may switch over to the control based on the first tracking error signal when the determining unit determines that the irradiation point of the optical beam is in the recorded area during performing the control based on the second tracking error signal. Accordingly, it is possible for the tracking servo unit to perform switching of control in a stable manner even in a non-recorded area.

The above-mentioned optical drive apparatus may further includes an RF signal generating unit that generates an RF signal based on a light receiving amount of the optical detector, and the determining unit may determine that an irradiation point of the optical beam is in a non-recorded area based on the RF signal. This also makes it possible to determine in an appropriate manner that the irradiation point of the optical beam comes into a non-recorded area.

In the above-mentioned optical drive apparatus, the determining unit may determine whether an irradiation point of the optical beam is in a non-recorded area or a recorded area based on the RF signal, and the tracking servo unit may switch over to a control based on the second tracking error signal when the determining unit determines that the irradiation point of the optical beam is in the non-recorded area during performing a control based on the first tracking error signal, and may switch over to the control based on the first tracking error signal when the determining unit determines that the irradiation point of the optical beam is in the recorded area during performing the control based on the second tracking error signal.

An optical drive apparatus according to another aspect of the present invention is an optical drive apparatus that reproduces an optical disk having a land and a groove and includes an optical system for irradiating a recording surface of the optical disk with an optical beam; an optical detector that receives a reflected light of the optical beam reflected from the recording surface; a first tracking-error-signal generating unit that generates a first tracking error signal by using a DPD method, based on a light receiving amount of the optical detector; and a tracking servo unit that controls the optical system based on the first tracking error signal.

According to the present invention, because the DPD method is employed instead of the DPP method in a tracking servo of a multilayer disk including a land and a groove, a complicated measure against a stray light is not required.

DETAILED DESCRIPTION OF THE EMBODIMENTS

Preferred embodiments of the present invention will be explained below in detail with reference to the accompanying drawings.

Figure 1:
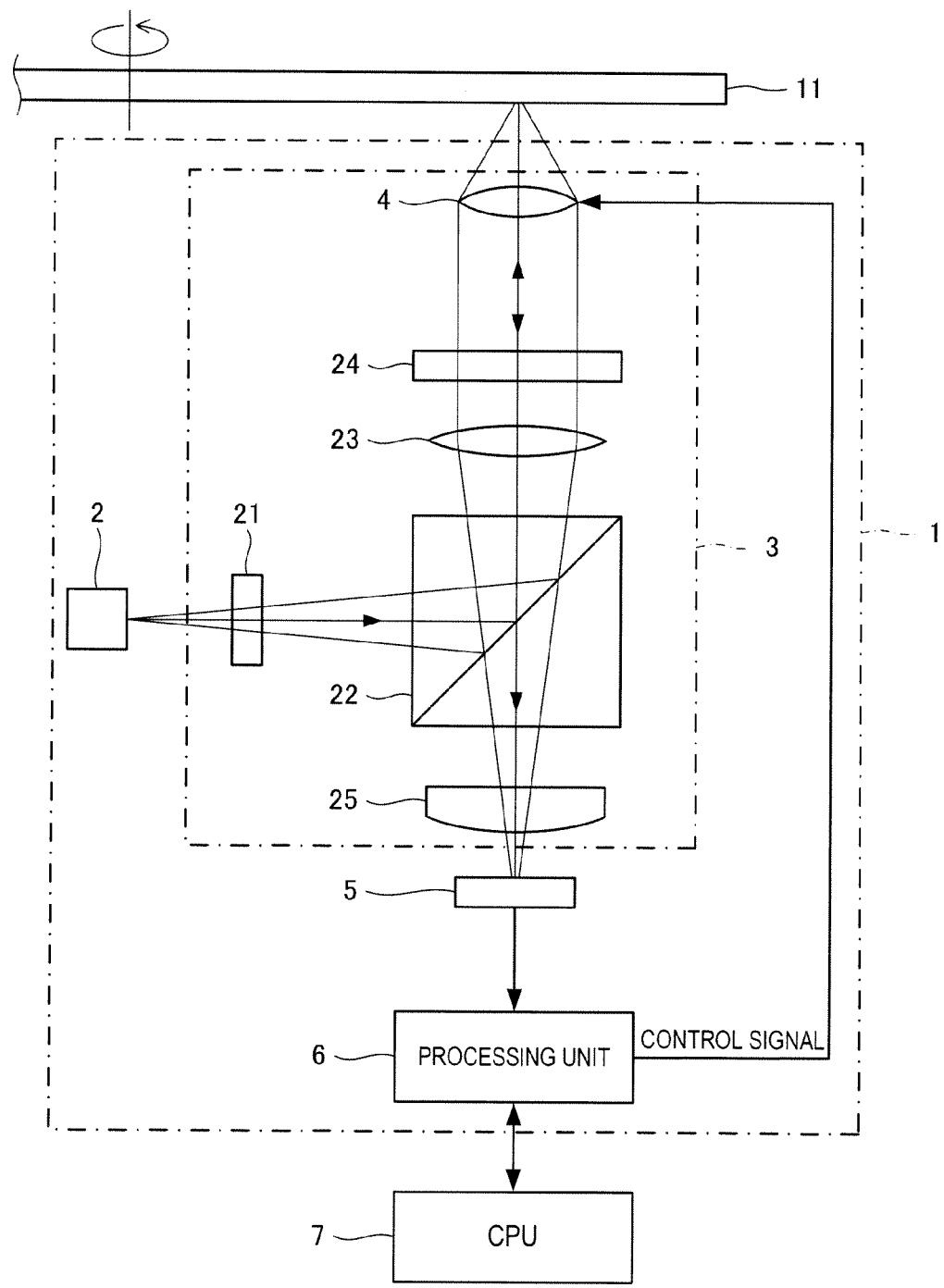
FIG. 1 is a schematic diagram of an optical drive apparatus according to a first embodiment of the present invention.

FIG. 1 is a schematic diagram of an optical drive apparatus 1 according to a first embodiment of the present invention.

The optical drive apparatus 1 performs reproducing and recording data with respect to an optical disk 11. Although various optical recording media, such as CD, DVD, and BD, can be used as the optical disk 11, a plate-shaped optical disk having a recording surface that is multilayered by multilayer films is particularly used in the first embodiment. In addition, although the optical disk includes several types that are classified by a recording method, such as a read only type (such as DVD-ROM and BD-ROM), a recordable type (such as DVD-R, DVD+R, and BD-R), and a rewritable type (such as DVD-RAM, DVD-RW, and BD-RE), the recordable type or the rewritable type is used in the first embodiment.

Figures 2A, 2B:
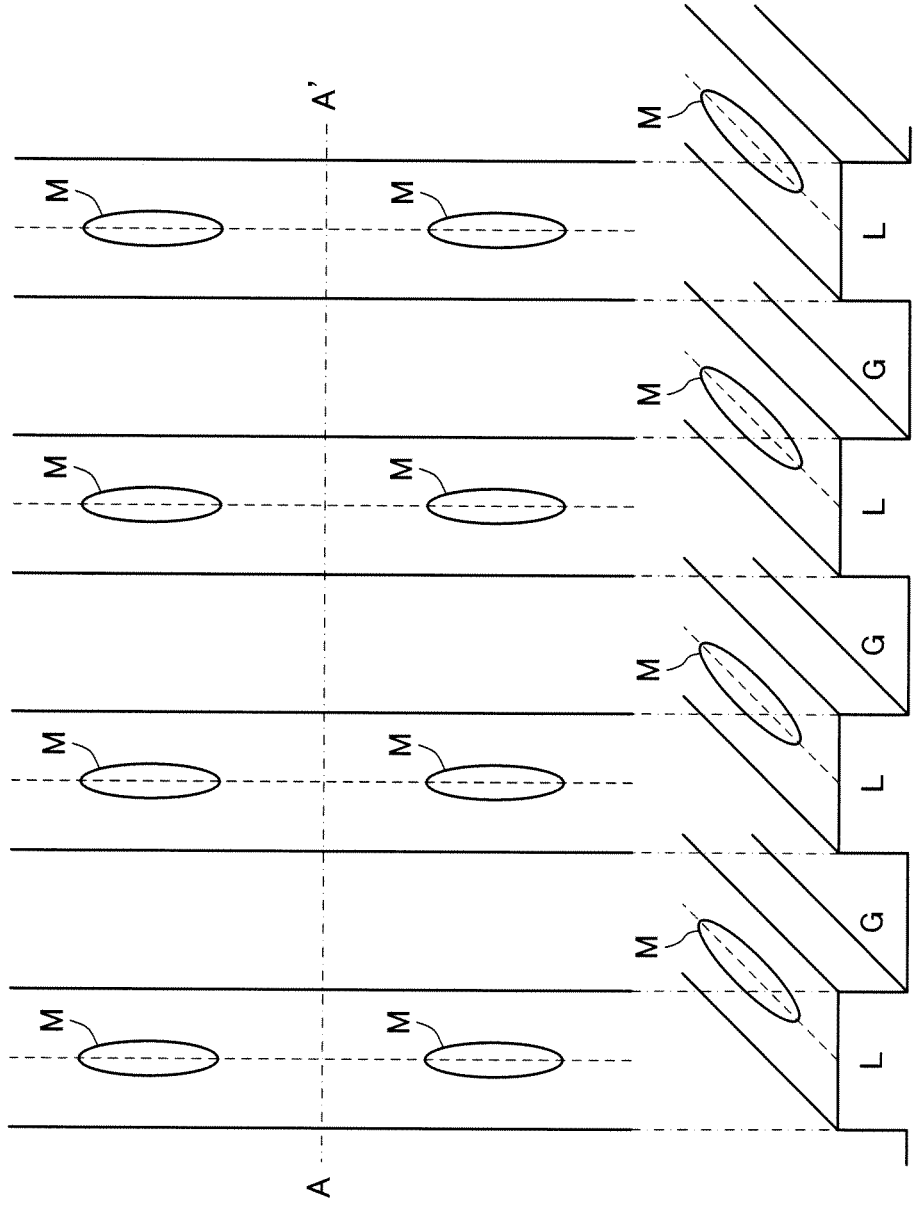
FIG. 2A is a plan view of a recording layer of the optical disk according to a first embodiment of the present invention.
FIG. 2B is a cross section along a line A-A' shown in FIG. 2A.

FIG. 2A is a plan view of a recording layer of the optical disk 11, and FIG. 2B is a cross section of the recording layer along a line A-A' shown in FIG. 2A.

As shown in FIGS. 2A and 2B, the recording layer has a plurality of tracks arranged at regular intervals. A convex portion of a track is called a land L, and a recess portion of the track is called a groove G. However, the convex portion and the recess portion of the track are relative to each other, and which one of the convex portion and the recess portion is called the land L varies according to a front surface or a back surface of the optical disk 11 whichever faces downwards. Although the land L and the groove G are drawn in a straight line in FIGS. 2A and 2B, in practice, they are slightly wobbling in a radial direction.

In the example shown in FIGS. 2A and 2B, the land L is a data write line, so that a code (a pit or a recording mark) M for storing data is provided on the land L. The code M is drawn with a lateral width much narrower than a width of the land L in FIGS. 2A and 2B for the sake of viewability of the drawings. The actual lateral width of the code M is slightly smaller than the width of the land L. The code M is recorded or deleted by an irradiation with an optical beam. A non-recorded area of the optical disk 11 is an area in which the code M is not recorded. The data write line can be provided on the groove G or can be provided on both the land L and the groove G.

Referring back to FIG. 1, the optical drive apparatus 1 includes a laser light source 2, an optical system 3, an optical detector 5, and a processing unit 6. Among these constituent elements, the laser light source 2, the optical system 3, and the optical detector 5 constitute an optical pickup.

The optical system 3 includes a diffraction grating 21, a beam splitter 22, a collimator lens 23, a quarter-wave plate 24, a sensor lens (a cylindrical lens) 25, and an objective lens 4. The optical system 3 serves as an outward path optical system that guides an optical beam emitted from the laser light source 2 to the optical disk 11, and at the same time, serves as a return path optical system that guides a reflected optical beam reflected from the optical disk 11 to the optical detector 5.

First, in the outward path optical system, the diffraction grating 21 divides the optical beam emitted from the laser light source 2 into three beams (the zeroth-order diffracted light and the ±first-order diffracted lights) and inputs the three beams to the beam splitter 22 as p-polarized lights. The beam splitter 22 reflects the incident p-polarized lights and bends its pathway to the optical disk 11. The collimator lens 23 collimates an optical beam input from the beam splitter 22. The quarter-wave plate 24 turns the optical beam passed through the collimator lens 23 into a circularly-polarized light. The optical beam passed through the quarter-wave plate 24 is input to the objective lens 4.

The objective lens 4 focuses the optical beam input from the quarter-wave plate 24 (the collimated optical beam) on the optical disk 11, and collimates a reflected optical beam reflected from the recording surface of the optical disk 11. The reflected optical beam is diffracted by a land and a groove of the recording surface, which is resolved into a zeroth-order diffracted light and ±first-order diffracted lights. These zeroth-order diffracted light and ±first-order diffracted lights are different from the zeroth-order diffracted light and the ±first-order diffracted lights generated by the diffraction grating 21. Hereinafter, to avoid a confusion, the zeroth-order diffracted light, the +(plus) first-order diffracted light, and the −(minus) first-order diffracted light generated by the diffraction grating 21 are referred to as "main beam MB", "sub-beam SB1", and "sub-beam SB2", respectively, and the zeroth-order diffracted light and the ±first-order diffracted lights indicate the diffracted lights generated by the land and the groove of the recoding surface. Each of the main beam MB, the sub-beam SB1, and the sub-beam SB2 generates a separate reflected light.

In the return path optical system, the optical beam that became an s-polarized light by passing through the objective lens 4 and reciprocating the quarter-wave plate 24 is incident on the collimator lens 23. The optical beam passed through the collimator lens 23 is incident on the beam splitter 22 while being focused. The beam splitter 22 passes the incident optical beam and inputs the optical beam to the sensor lens (a cylindrical lens). The sensor lens 25 applies an astigmatism to the optical beam that is input from the beam splitter 22. The optical beam that is applied with the astigmatism is incident on the optical detector 5.

Figure 3:
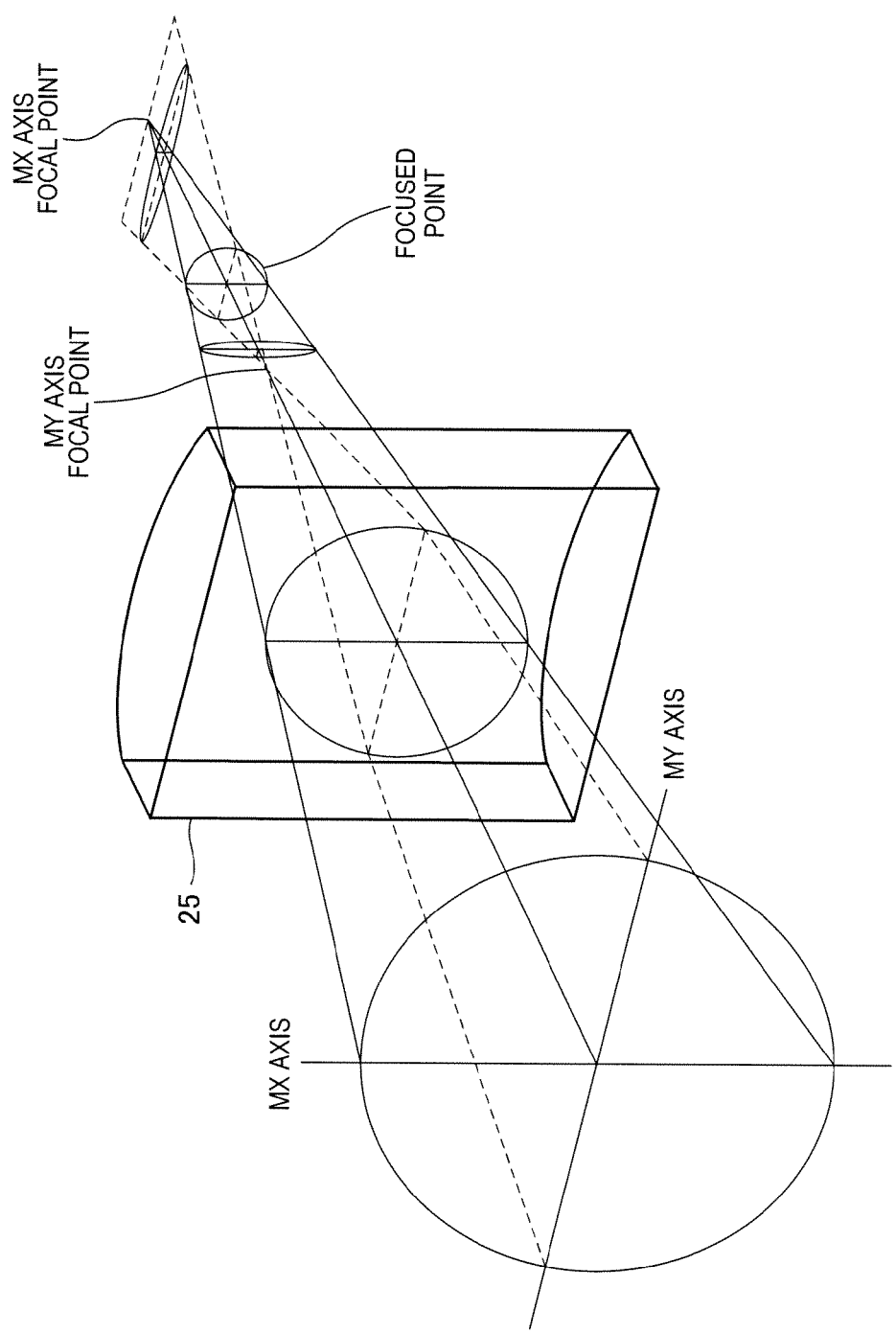
FIG. 3 is a schematic diagram for explaining the astigmatism applied by the sensor lens according to a first embodiment of the present invention.

FIG. 3 is a schematic diagram for explaining the astigmatism applied by the sensor lens 25. As shown in FIG. 3, the sensor lens 25 has a lens effect only in one direction (an MY axis direction in FIG. 3=a tangential line direction). Therefore, a focal point of an optical system constituted by the collimator lens 23 (FIG. 1) and the sensor lens 25 is different between the MY axis direction and an MX axis direction (a sagittal line direction) that is perpendicular to the MY axis direction (MY axis focal point and MX axis focal point shown in FIG. 3). A point at which lengths of the optical beams in the MY axis direction and the MX axis direction are equal to each other is referred to as a focused point.

In the optical drive apparatus 1, a position control for the objective lens 4 is performed (focus servo) in such a manner that a focused point of an optical beam (a signal light) reflected from a layer to be focused (an access layer) is positioned right on the optical detector 5. In other words, a focused point of an optical beam (a stray light) reflected from layers other than the access layer is not positioned on the optical detector 5. Therefore, a spot (a stray light spot) that is formed on the optical detector 5 by the stray light has a shape elongated to at least one of the MY axis direction and the MX axis direction, as compared to a spot (a signal light spot) that is formed on the optical detector 5 by the signal light.

Referring back to FIG. 1, the optical detector 5 is arranged on a plane that intersects with an optical path of the reflected optical beam that is output from the optical system 3. The optical detector 5 includes three light receiving surfaces, and each of the light receiving surfaces is divided into a plurality of light receiving areas. In the optical drive apparatus 1, various signals including a focus error signal FE, a full add signal (a pull-in signal PI and an RF signal RF), and tracking error signals $TE_{DPD}$ and $TE_{DPP}$ can be generated by using an appropriate combination of the light receiving areas. Details of this aspect are described later.

The processing unit 6 is constituted by, for example, a DSP (Digital Signal Processor) having an A/D converter function that converts an analog signal of multiple channels into digital data. The processing unit 6 receives an output signal of the optical detector 5, and generates the focus error signal FE, the full add signal (the pull-in signal PI and the RF signal RF), and the tracking error signals $TE_{DPD}$ and $TE_{DPP}$. Details of the processing unit 6 are described later.

A CPU 7 is a built-in processing unit of a computer or a DVD recorder. The CPU 7 transmits an instruction signal for specifying an access point on the optical disk 11 to the processing unit 6 via an interface (not shown). Upon receiving the instruction signal, the processing unit 6 achieves the on-track state (tracking servo) by controlling the objective lens 4 to move it in a direction parallel to the surface of the optical disk 11 (this operation is called "lens shift"). When the on-track state is achieved, the CPU 7 acquires the RF signal RF, which is generated by the processing unit 6, as a data signal. Details of the configuration of the optical detector 5 and processing of the processing unit 6 are explained below.

Figure 4:
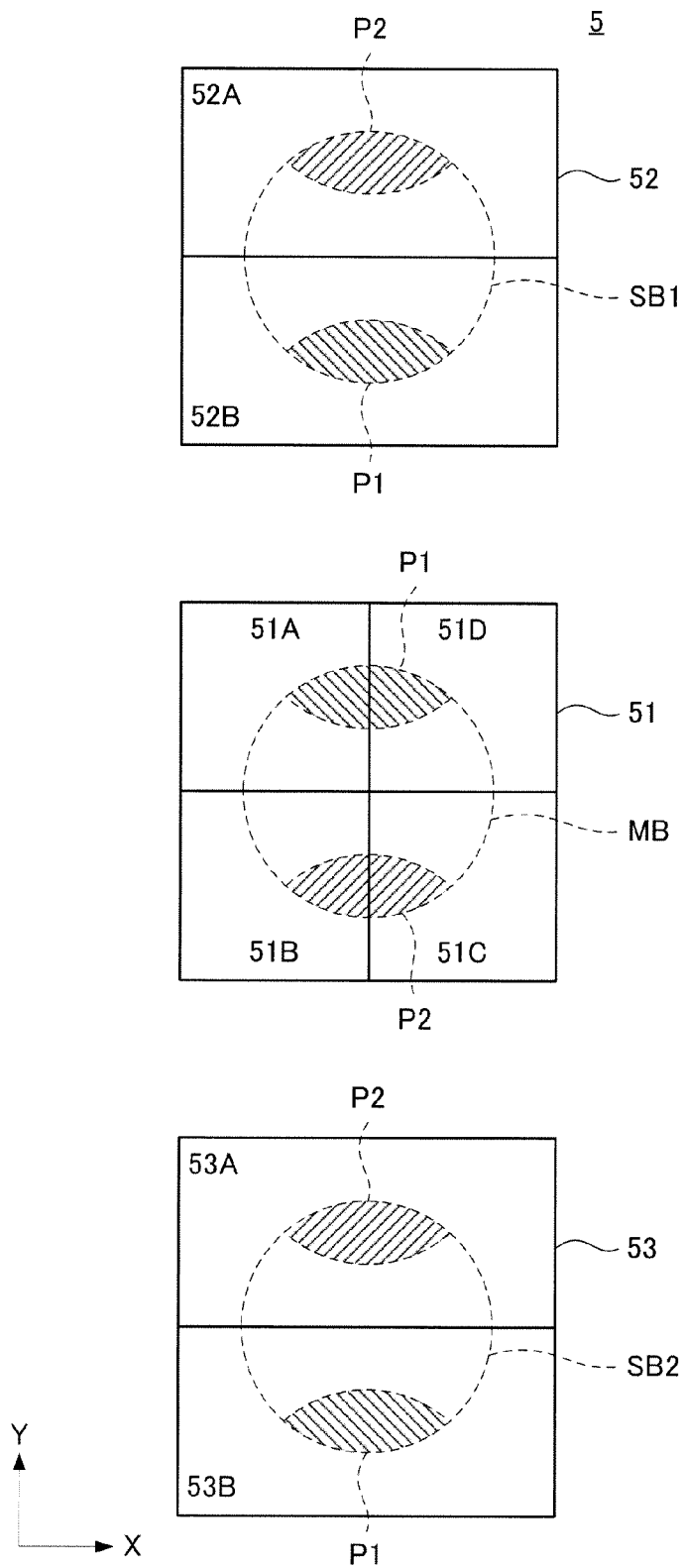
FIG. 4 is a top view of the optical detector according to a first embodiment of the present invention.

FIG. 4 is a top view of the optical detector 5 according to the first embodiment. FIG. 4 shows an example of a spot that is formed on a light receiving surface by a signal light. X and Y directions shown in FIG. 4 correspond to a tangential direction and a radial direction of the optical disk, respectively.

As shown in FIG. 4, the optical detector 5 includes three square-shaped light receiving surfaces 51 to 53. The light receiving surface 51 is divided into four squares of the same dimension (light receiving areas 51A to 51D). Each of the light receiving surfaces 52 and 53 is divided into two rectangles of the same dimension up and down (light receiving areas 52A and 52B and light receiving areas 53A and 53B, respectively). The light receiving surfaces 51 to 53 are located at positions to receive the main beam MB, the sub-beam SB1, and the sub-beam SB2, respectively.

Upon receiving an optical beam, the optical detector 5 outputs a signal having an amplitude of a value (a received light amount) obtained from a surface integral of an intensity of the optical beam over a light receiving surface for each of the light receiving areas. Hereinafter, an output signal corresponding to a light receiving area X is represented by $I_x$.

Figure 5:
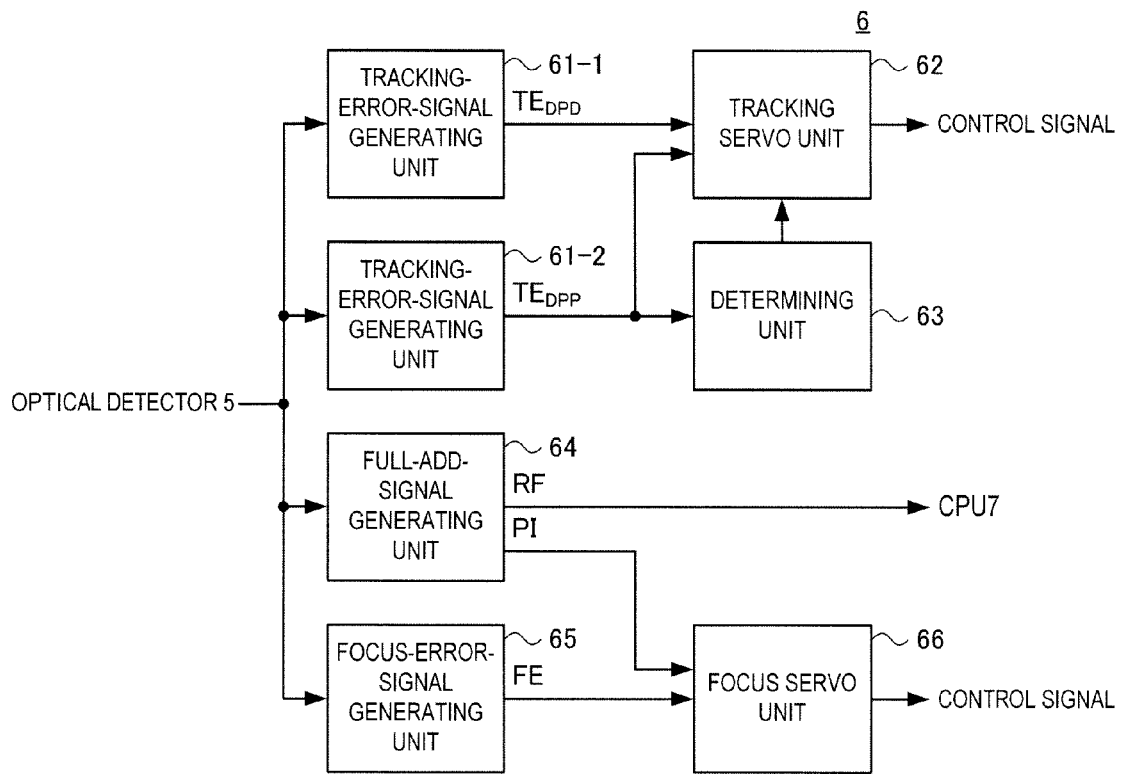
FIG. 5 is a functional block diagram of the processing unit according to a first embodiment of the present invention.

FIG. 5 is a functional block diagram of the processing unit 6. As shown in FIG. 5, the processing unit 6 includes a tracking-error-signal generating unit 61-1 (first tracking-error-signal generating unit), a tracking-error-signal generating unit 61-2 (second tracking-error-signal generating unit), a tracking servo unit 62 (tracking servo unit), a determining unit 63 (determining unit), a full-add-signal generating unit 64 (RF signal generating unit), a focus-error-signal generating unit 65, and a focus servo unit 66.

The tracking-error-signal generating unit 61-1 generates the tracking error signal $TE_{DPD}$ (first tracking error signal) by the DPD method based on the output signal of the optical detector 5. A method of generating the tracking error signal $TE_{DPD}$ is explained in detail below.

When the tracking error signal $TE_{DPD}$ is generated, the tracking-error-signal generating unit 61-1 acquires two phase difference signals $S1p=P(I_{51A}, I_{51B})$ and $S2p=P(I_{52C}, I_{51D})$ from the output signal of the optical detector 5, where $P(X,Y)$ is a function representing a phase difference between a signal X and a signal Y. The tracking-error-signal generating unit 61-1 then performs an addition of the phase difference signals $S1p$ and $S2p$, and outputs a result of the addition as the tracking error signal $TE_{DPD}$.

The phase difference represented by the phase difference signals $S1p$ and $S2p$ becomes zero in a state where a focal point of an incident light on a recording surface is at a center of a track as a result of diffraction of the optical beam by the code M, and increases as the focal point of the incident light on the recording surface moves away from the center of the track. Therefore, it is possible to achieve the on-track state by controlling the objective lens 4 in such a manner that a sum of the phase differences represented by the tracking error signal $TE_{DPD}$ becomes zero.

However, the phase difference represented by the phase difference signals $S1p$ and $S2p$ becomes zero not only when the on-track state is achieved but also when the optical beam is incident on an area where there is no code M (a non-recorded area). Therefore, in the non-recorded area, it is not possible to achieve the on-track state by the DPD method.

The tracking-error-signal generating unit 61-2 generates the tracking error signal $TE_{DPP}$ (a second tracking error signal) based on the output signal of the optical detector 5. A method of generating the tracking error signal $TE_{DPP}$ is explained in detail below.

When the tracking error signal $TE_{DPP}$ is generated, the tracking-error-signal generating unit 61-2 calculates a differential push-pull signal DPP by using the following equation (1), and outputs the differential push-pull signal DPP as the tracking error signal $TE_{DPP}$, where MPP and SPP are main push-pull signal and sub-push-pull signal, represented by the following equations (2) and (3), respectively. 'k' is a positive constant determined in such a manner that lens shift offsets respectively generated in the main push-pull signal MPP and the sub-push-pull signal SPP (offsets generated by the lens shift described above) are canceled each other.

$$DPP=MPP-kSPP \qquad (1)$$

$$MPP=(I_{51A}+I_{51D})-(I_{51B}+I_{51C}) \qquad (2)$$

$$SPP=(I_{52A}+I_{53A})-(I_{52B}-I_{53B}) \qquad (3)$$

As shown in FIG. 4, each of the beams MB, SB1, and SB2 includes push-pull areas P1 and P2. The push-pull areas P1 and P2 are areas in which the zeroth-order diffracted light and ±first-order diffracted lights interfere with each other, and as shown in FIG. 4, a positional relation between the push-pull area P1 and the push-pull area P2 is reversed between the main beam MB and the sub-beams SB1 and SB2.

Relative intensities of the push-pull areas P1 and P2 vary with a movement of the focal point of the incident light on the recording surface in the radial direction of the optical disk (that is, a movement in a direction crossing a track). When the focal point of the incident light on the recording surface is at the center of the track, the intensities of the push-pull areas P1 and P2 are equal to each other. Therefore, a value of the main push-pull signal MPP becomes zero in a state where the focal point of the incident light on the recording surface is at the center of the track, and otherwise a nonzero value. The same is true for the sub-push-pull signal SPP. However, as described above, because the phase relation of the push-pull area P1 and the push-pull area P2 is reversed between the main beam MB and the sub-beams SB1 and SB2, there exists a phase difference of 180 degrees between the main push-pull signal MPP and the sub-push-pull signal SPP, with opposite signs. Therefore, a value of the differential push-pull signal DPP defined by the equation (1) also becomes zero in a state where the focal point of the incident light on the recording surface is at the center of the track, and otherwise a nonzero value, which makes it possible to achieve the on-track state by controlling the objective lens 4 in such a manner that the tracking error signal $TE_{DPP}$ becomes zero.

The tracking servo unit 62 controls (tracking servo) the optical system 3 (more specifically, the objective lens 4) based on either one of the tracking error signals $TE_{DPD}$ and $TE_{DPP}$. Hereinafter, a mode of controlling the optical system 3 based on the tracking error signal $TE_{DPD}$ is referred to as a DPD mode, and a mode of controlling the optical system 3 based on the tracking error signal $TE_{DPP}$ is referred to as a DPP mode.

When the instruction signal described above is input from the CPU 7, the tracking servo unit 62 first starts the tracking servo in the DPD mode, and achieves the on-track state. Thereafter, if a result of determination indicating that the irradiation position of the optical beam is in a non-recorded area is notified from the determining unit 63 during the tracking servo is performed in the DPD mode, the tracking servo unit 62 switches over to the DPP mode, and performs the tracking servo in the DPP mode. On the contrary, if a result of determination indicating that the irradiation position of the optical beam is in a recorded area is notified from the determining unit 63 during the tracking servo is performed in the DPP mode, the tracking servo unit 62 switches over to the DPD mode, and performs the tracking servo in the DPD mode. These switching processes are explained in detail later with an explanation on the determining unit 63.

The determining unit 63 determines whether the irradiation point (a focal point) of the optical beam is in a non-recorded area or a recorded area in an access layer. Specifically, the determining unit 63 monitors the tracking error signal $TE_{DPP}$ generated by the tracking-error-signal generating unit 61-2, and performs the above determination based on whether the tracking error signal $TE_{DPP}$ changes beyond a predetermined range. Details of this operation are explained below.

Figure 6:
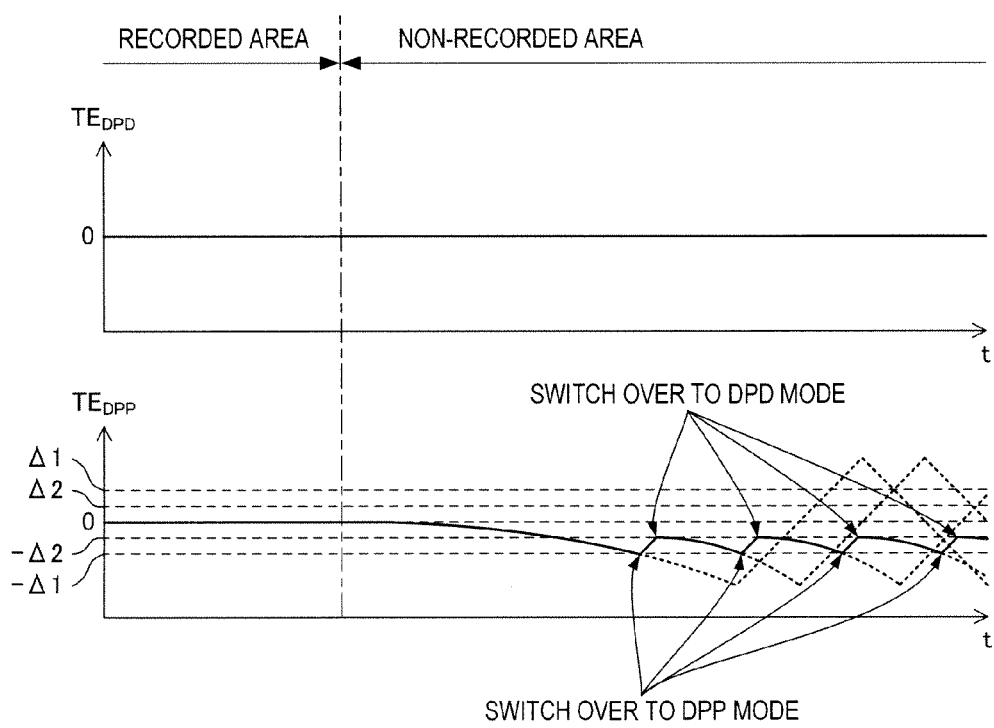
FIG. 6 is a graph showing temporal changes of the tracking error signals $TE_{DPD}$ and $TE_{DPP}$ when performing a reproduction of a disk while maintaining vicinity of the center of the track in the optical drive apparatus according to a first embodiment of the present invention.

FIG. 6 is a graph showing temporal changes of the tracking error signals $TE_{DPD}$ and $TE_{DPP}$ when performing a reproduction of a disk while maintaining vicinity of the center of the track. A solid line of the tracking error signal $TE_{DPP}$ indicates a case where mode switching is performed according to the first embodiment, and a dotted line indicates a case where switching to the DPP mode according to the first embodiment is not performed.

When the focal point is in a recorded area and the focal point is at the center of the track, a value of the tracking error signal $TE_{DPD}$ becomes zero. On the other hand, when the focal point is at a position slightly deviated from the center of the track, the value of the tracking error signal $TE_{DPD}$ becomes a nonzero value. Therefore, the on-track state can be achieved in an appropriate manner by controlling the objective lens 4 in such a manner that the tracking error signal $TE_{DPD}$ becomes zero by the tracking servo unit 62. With this operation, as shown in FIG. 6, a value of the tracking error signal $TE_{DPP}$ is also maintained to zero.

On the other hand, when the focal point is in a non-recorded area, because there is no code M at the irradiation point of the optical beam, the value of the tracking error signal $TE_{DPD}$ is maintained to zero even if the focal point is deviated from the track. Therefore, while the tracking servo unit 62 performs a control based on the tracking error signal $TE_{DPD}$, the irradiation point of the optical beam becomes gradually deviated from the track. With this deviation, the value of the tracking error signal $TE_{DPP}$ becomes gradually away from zero as shown in FIG. 6, and finally, repeats a fluctuation as in the case of a track jump.

The determining unit 63 determines whether the irradiation point of the optical beam is in a non-recorded area or a recorded area in the access layer by detecting such a change of the value of the tracking error signal $TE_{DPP}$. That is, the determining unit 63 stores therein predetermined threshold values $\Delta1$ and $\Delta2$ ($0 \leq \Delta2 < \Delta1$) in advance, and during the tracking servo unit 62 performs a control based on the tracking error signal $TE_{DPD}$, determines that the irradiation point of the optical beam comes into a non-recorded area in the access layer if the value of the tracking error signal $TE_{DPP}$ is beyond a range of $-\Delta1$ to $\Delta1$ (which means that the determining unit 63 makes such determination, but it is not guaranteed 100% that the irradiation point of the optical beam actually comes into the non-recorded area). On the contrary, the determining unit 63 determines that the irradiation point of the optical beam comes into a recorded area in the access layer if the value of the tracking error signal $TE_{DPP}$ is within a range of $-\Delta2$ to $\Delta2$ (which means that the determining unit 63 makes such determination, but it is not guaranteed 100% that the irradiation point of the optical beam actually comes into the recorded area).

The determining unit 63 notifies the result of determination obtained in the above manner to the tracking servo unit 62. Upon being notified of a result of determination that the irradiation point of the optical beam comes into a non-recorded area in the access layer, the tracking servo unit 62 stops the tracking servo in the DPD mode, and switches over to a tracking servo in the DPP mode. On the other hand, upon being notified of a result of determination that the irradiation point of the optical beam comes into a recorded area, the tracking servo unit 62 stops the tracking servo in the DPP mode, and switches over to a tracking servo in the DPD mode.

Figure 7:
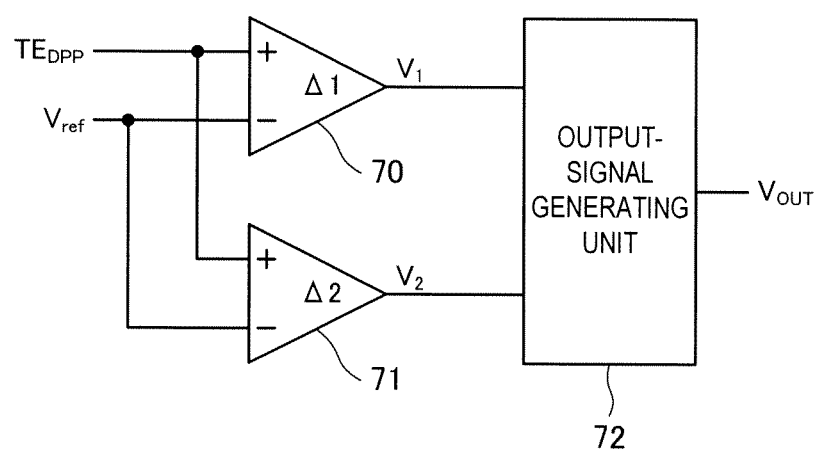
FIG. 7 is a schematic diagram showing an internal circuit of the determining unit according to a first embodiment of the present invention.

FIG. 7 is a schematic diagram showing a specific internal circuit of the determining unit 63. As shown in FIG. 7, the determining unit 63 includes comparators 70 and 71 and an output-signal generating unit 72. Each of the comparators 70 and 71 includes two input terminals to which the tracking error signal $TE_{DPP}$ and a reference potential $V_{ref}$ are input, respectively. The reference potential $V_{ref}$ is a potential of the tracking error signal $TE_{DPP}$ when the focal point of the optical beam is at the center of the track, which is determined in an arbitrary manner considering an operation point of the circuit and the like. That is, the tracking error signal $TE_{DPP}$ takes a value incorporating the reference potential $V_{ref}$. The output-signal generating unit 72 receives an output signal $V_1$ of the comparator 70 and an output signal $V_2$ of the comparator 71, and generates an output signal $V_{out}$.

Figure 8:
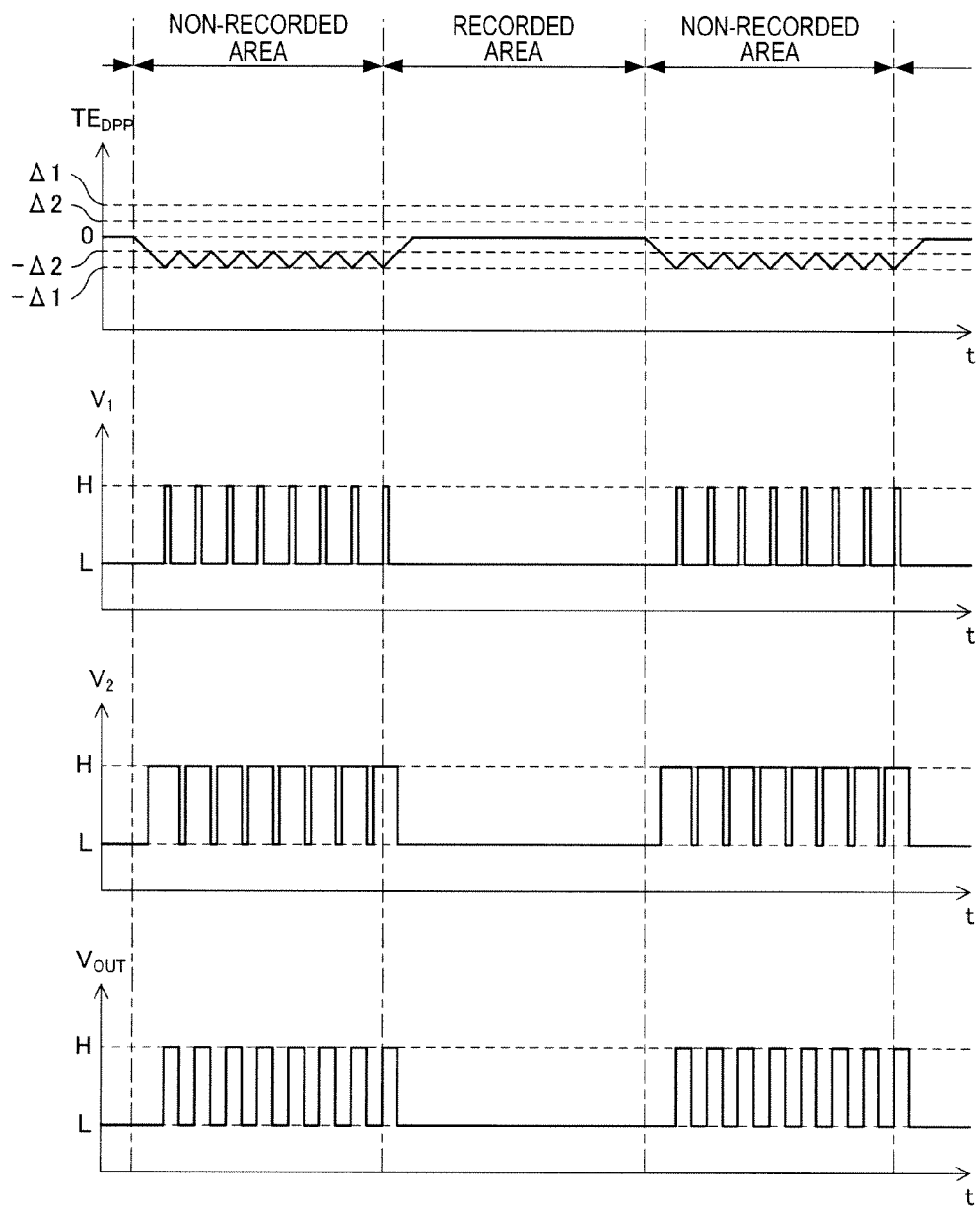
FIG. 8 is a graph showing temporal changes of an output signal $V_{out}$ of the determining unit when performing a reproduction of a disk while maintaining vicinity of the center of the track, plotted with the temporal change of the tracking error signal $TE_{DPP}$ in the optical drive apparatus according to a first embodiment of the present invention.

FIG. 8 is a graph showing temporal changes of the signals $V_1$, $V_2$, and $V_{out}$ when performing a reproduction of a disk while maintaining vicinity of the center of the track, plotted with the temporal change of the tracking error signal $TE_{DPP}$. A time scale of the graph shown in FIG. 8 is shorter than a time scale of the graph shown in FIG. 6. As can be understood from FIG. 8, the comparator 70 sets a value of the signal $V_1$ to low when the value of the tracking error signal $TE_{DPP}$ is within the range of $-\Delta1$ to $\Delta1$, and otherwise sets the value of the signal to high. On the other hand, the comparator 71 sets a value of the signal $V_2$ to low when the value of the tracking error signal $TE_{DPP}$ is within the range of $-\Delta2$ to $\Delta2$, and otherwise sets the value of the signal $V_2$ to high. The output-signal generating unit 72 sets a value of the output signal $V_{out}$ to high at a rising edge of the signal $V_1$, and sets the value of the output signal $V_{out}$ to low at a falling edge of the signal $V_2$. The determining unit 63 notifies the output signal $V_{out}$ to the tracking servo unit 62 as the result of determination whether the irradiation point of the optical beam is in a non-recorded area or a recorded area in the access layer.

The tracking servo unit 62 performs mode switching in response to the output signal $V_{out}$. That is, the tracking servo unit 62 switches over to the DPD mode when the value of the output signal $V_{out}$ is low, and to the DPP mode when the value of the output signal $V_{out}$ is high. As a result, the tracking error signal $TE_{DPP}$ changes with a pattern shown in FIG. 8.

Note that, when the irradiation point of the optical beam is in a non-recorded area, as shown in FIG. 8, the output signal $V_{out}$ becomes a signal that shows a considerable fluctuation. Because of this fluctuation, if the tracking servo unit 62 performs the mode switching by responding the output signal $V_{out}$ in a sensitive manner, there is a possibility that the mode switching occurs frequently in the non-recorded area, resulting in an unstable tracking servo. To avoid this problem, it is preferable to perform switching from the DPP mode to the DPD mode with a certain degree of delay. Specifically, the tracking servo unit 62 can delay its process or the determining unit 63 can delay an output timing of the result of determination.

Figure 9:
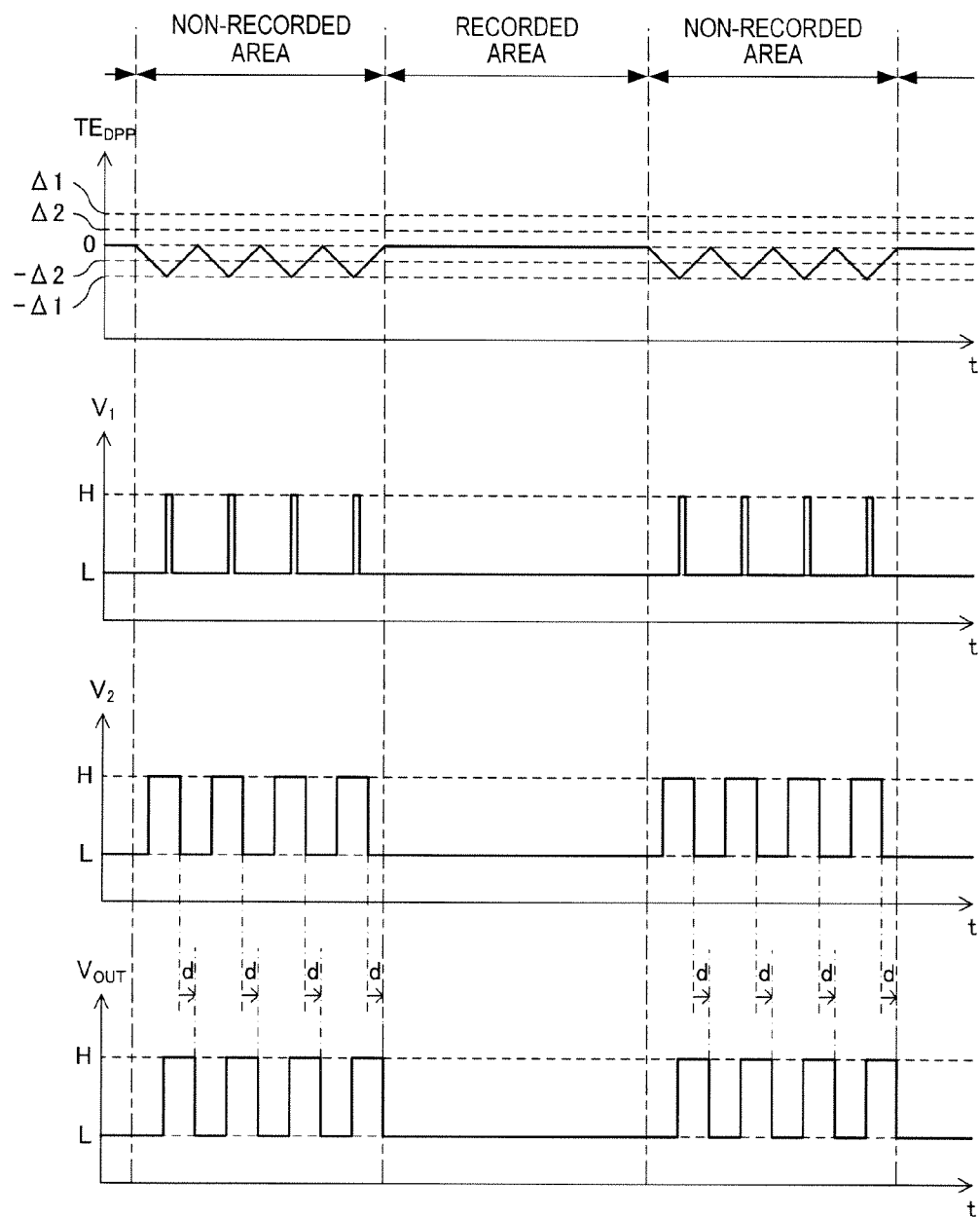
FIG. 9 is a graph showing temporal changes of an output signal $V_{out}$ of the determining unit when performing a reproduction of a disk while maintaining vicinity of the center of the track, plotted with the temporal change of the tracking error signal $TE_{DPP}$ in the optical drive apparatus according to a modification of the first embodiment of the present invention.

FIG. 9 shows a specific example of the delay process. Similarly to FIG. 8, FIG. 9 is a graph showing temporal changes of the signals $V_1$, $V_2$, and $V_{out}$ when performing a reproduction of a disk while maintaining vicinity of the center of the track, plotted with the temporal change of the tracking error signal $TE_{DPP}$. However, in the example shown in FIG. 9, a timing at which the output signal $V_{out}$ is set to low by the output-signal generating unit 72 of the determining unit 63 is not right after falling of the signal $V_2$ but after an elapse of a predetermined delay time d from the falling of the signal $V_2$. For example, the delay time d is a time for which the tracking error signal $TE_{DPP}$ is returned to zero. In this example, as shown in FIG. 9, because it is possible to return the tracking error signal $TE_{DPP}$ to near zero, a fluctuation period of the output signal $V_{out}$ is lengthened. Therefore, because a frequency of switching the DPD mode and the DPP mode can be reduced, it is possible to perform the tracking servo in a relatively stable manner.

As described above, with the optical drive apparatus 1 according to the first embodiment, when performing a reproduction of a disk while maintaining the on-track state by performing a tracking servo by the DPD method, if the irradiation point of the optical beam comes into a non-recorded area, it is possible to switch over to a tracking servo by the DPP method.

Referring back to FIG. 5, the full-add-signal generating unit 64 generates the RF signal RF and the pull-in signal PI based on a light receiving amount of each of the light receiving areas 51A to 51D that constitute the light receiving surface 51 for receiving the main beam MB. Specifically, the full-add-signal generating unit 64 generates these signals by performing a calculation using the following equation (4). As is clear from the equation (4), the RF signal RF and the pull-in signal PI are the same signal. However, the pull-in signal PI is normally output in a bandwidth-limited state by being passed through a low pass filter. The reason why it is bandwidth-limited is to remove fluctuation caused by existence of the code M or noise.

$$RF=PI=I_{51A}+I_{51B}+I_{51C}+I_{51D} \quad (4)$$

The pull in signal PI is a signal used in the focus servo unit 66 for recognizing a layer. That is, the pull-in signal PI has a property that it becomes a local maximum when the optical beam is focused on the surface of the recording layer while the focal point of the optical beam moves between layers. The focus servo unit 66 detects that the focal point of the optical beam is near the recording layer by comparing a value of the pull-in signal PI with a predetermined threshold value and detecting a portion in which the value of the pull-in signal PI is higher than the threshold value.

The RF signal RF is input to the CPU 7 as a data signal. The CPU 7 acquires data written in the optical disk 11 based on the RF signal RF.

The focus-error-signal generating unit 65 generates the focus error signal FE based on the light receiving amount of each of the light receiving areas 51A to 51D that constitute the light receiving surface 51 for receiving the main beam MB. Specifically, the focus-error-signal generating unit 65 generates the focus error signal FE by performing a calculation using the following equation (5).

$$FE=(I_{51A}+I_{51C})-(I_{51B}+I_{51D}) \quad (5)$$

The focus servo unit 66 controls a position of the objective lens 4 in a direction perpendicular to the recording surface of the optical disk 11, and adjusts the focal point of the optical beam on the recording layer by adjusting a value of the focus error signal FE to zero (focus servo).

Figure 10:
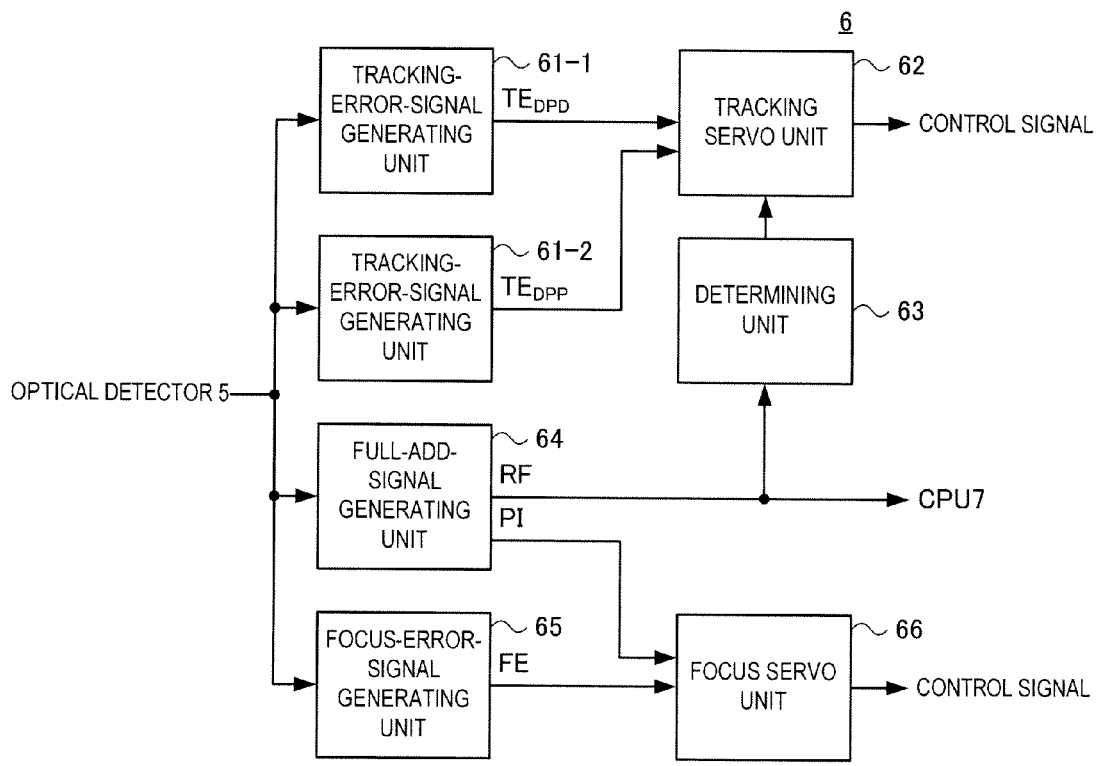
FIG. 10 is a functional block diagram of the processing unit of an optical drive apparatus according to a second embodiment of the present invention.

FIG. 10 is a functional block diagram of the processing unit 6 of an optical drive apparatus 1 according to a second embodiment of the present invention. The optical drive apparatus 1 according to the second embodiment is the same as the optical drive apparatus 1 according to the first embodiment except that a part of the process of the determining unit 63 differs. Details of the second embodiment are explained below focusing on processes of the determining unit 63.

As shown in FIG. 10, the RF signal RF, instead of the tracking error signal $TE_{DPP}$, is input to the determining unit 63 according to the second embodiment. The determining unit 63 detects whether the irradiation point of the optical beam is in a non-recorded area or a recorded area in an access layer based on the RF signal RF. Detailed explanations of this detection are given below.

Figure 11:
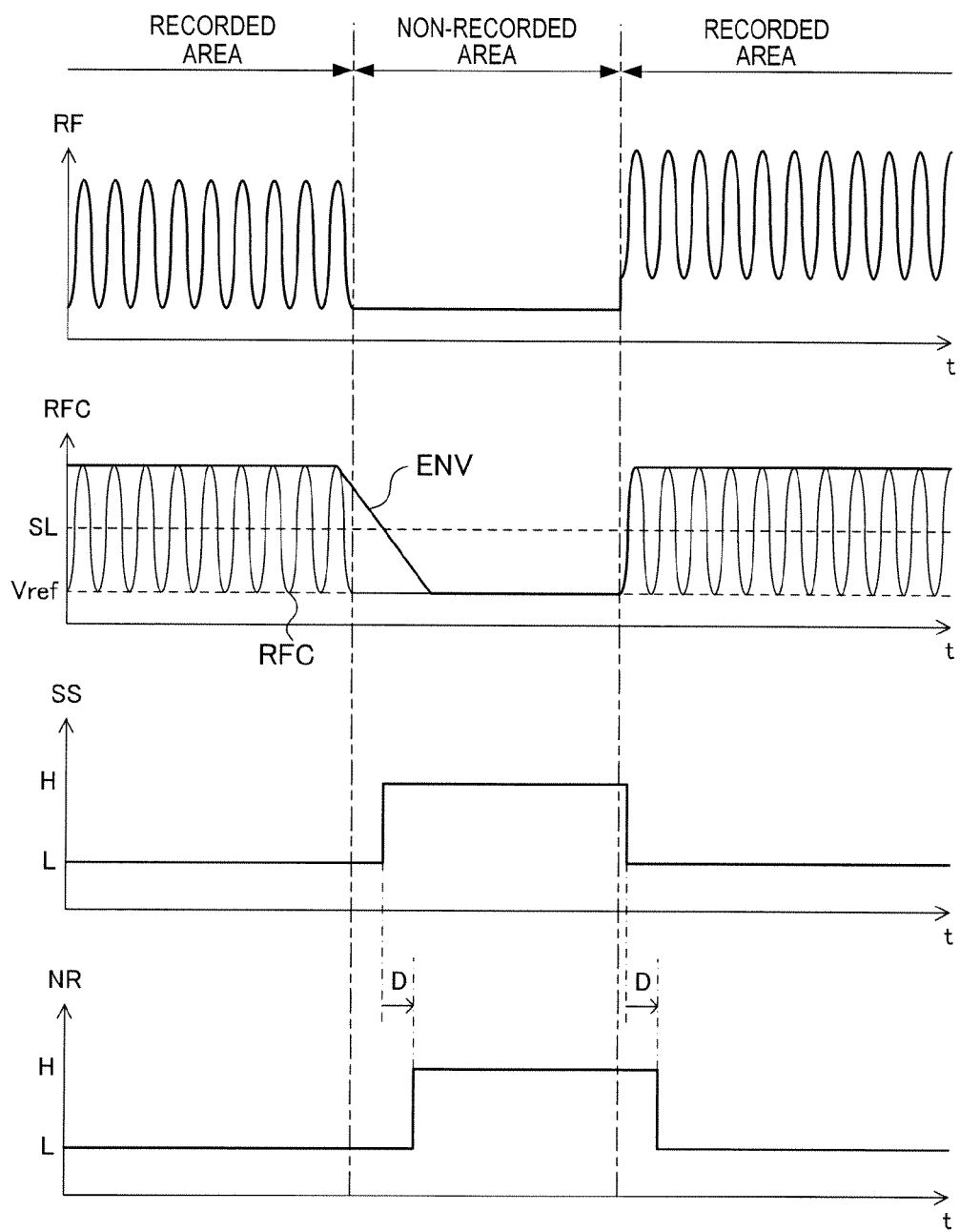
FIG. 11 is a graph showing temporal changes of various signals used by the determining unit according to a second embodiment of the present invention while performing a reproduction of a disk maintaining vicinity of the center of the track.

FIG. 11 is a graph showing temporal changes of various signals used by the determining unit 63 while performing a reproduction of a disk maintaining vicinity of the center of the track.

First, the RF signal RF is, as shown in FIG. 11, a signal that makes a sharp fluctuation with a short period in a recorded area. Because this fluctuation is corresponding to a change of reflectivity due to the code M, the RF signal RF shows no fluctuation in a non-recorded area. Although an example is shown in FIG. 11, an offset that changes according to a nonuniform reflectivity of the recording layer and a common focal point crosstalk appears in the RF signal RF. An amplitude of the RF signal RF also can be changed by the nonuniform reflectivity of the recording layer and the common focal point crosstalk. Accordingly, the determining unit 63 first performs a bottom clamping process for aligning bottom values of the RF signal RF, and obtains a clamp signal RFC shown in FIG. 11.

Upon obtaining the clamp signal RFC, the determining unit 63 obtains a top envelope signal ENV representing an envelope of maximum values of the clamp signal RFC at a predetermined droop rate. Thereafter, the determining unit 63 obtains a slice signal SS by slicing the top envelope signal ENV with a predetermined slice level SL that is pre-stored. It is preferable to set the slice level SL to about an intermediate value between the maximum value and the minimum value of the clamp signal RFC.

Finally, the determining unit 63 generates a non-recorded area detection signal NR based on the slice signal SS. Specifically, the determining unit 63 generates the non-recorded area detection signal NR by setting the non-recorded area detection signal NR to high when the slice signal SS is maintained to high for a predetermined time D or longer and setting the non-recorded area detection signal NR to low when the slice signal SS is maintained to low for a predetermined time D or longer. The reason why the determining unit 63 performs a delay process of rising and falling is to prevent an erroneous determination of the non-recorded area or the recorded area due to noise because the RF signal RF has a property that is largely affected by the noise.

The non-recorded area detecting signal NR is a signal that indicates that the irradiation point of the optical beam comes into the recorded area in the access layer when it is low, and that the irradiation point of the optical beam comes into the non-recorded area in the access layer when it is high. The determining unit 63 notifies the non-recorded area detection signal NR to the tracking servo unit 62 as a result of determination whether the irradiation point of the optical beam is in the non-recorded area or the recorded area in the access layer. The tracking servo unit 62 performs mode switching based on the input non-recorded area detection signal NR. That is, the tracking servo unit 62 switches over to the DPD mode when the non-recorded area detection signal NR is low and to the DPP mode when the non-recorded area detection signal NR is high. FIG. 11 shows an example of generating the non-recorded area detection signal NR by processing the RF signal RF.

As described above, with the optical drive apparatus 1 according to the second embodiment, when performing a reproduction of a disk while maintaining the on-track state by performing a tracking servo by the DPD method, if the irradiation point of the optical beam comes into a non-recorded area, it is also possible to switch over to a tracking servo by the DPP method.

While preferred embodiments of the present invention have been explained above, the present invention is not at all limited to these embodiments, and it is needless to mention that the present invention can be carried out by various modes without departing from the scope thereof.

For example, it is also acceptable that the determining unit 63 generates both the output signal $V_1$ and the non-recorded area detection signal NR, performs determination and notification that the irradiation point of the optical beam comes into a recorded area based on the non-recorded area detection signal NR, and performs determination and notification that the irradiation point of the optical beam comes into a non-recorded area based on the output signal $V_1$. As described above, the output signal $V_{out}$ that is generated from the signals $V_1$ and $V_2$ makes a sharp fluctuation when the irradiation point of the optical beam is in the non-recorded area. Therefore, when switching from the DPP mode to the DPD mode, it is preferable to perform the process with a certain degree of delay, and this delay can be achieved by combining the signal $V_1$ and the non-recorded area detection signal NR. That is, it suffices that the determining unit 63 performs the determination and notification that the irradiation point of the optical beam comes into the recorded area based on the non-recorded area detection signal NR and the determination and notification that the irradiation point of the optical beam comes into the non-recorded area based on the signal $V_1$. With this operation, the tracking servo unit 62 can perform the mode switching in a stable manner even in the non-recorded area.

Figure 12:
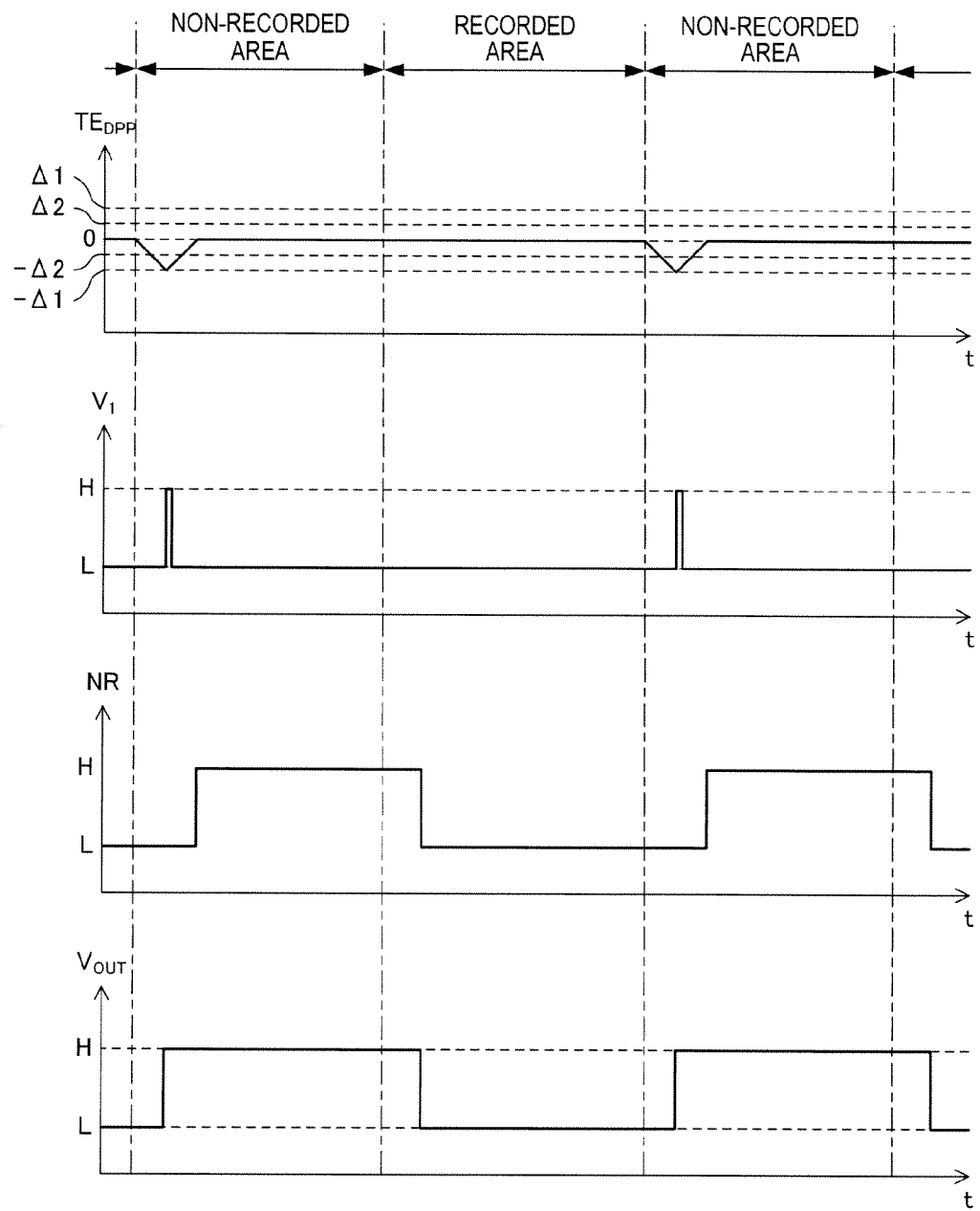
FIG. 12 is a graph showing temporal changes of an output signal $V_{out}$ of the determining unit when performing a reproduction of a disk while maintaining vicinity of the center of the track, plotted with the temporal change of the tracking error signal $TE_{DPP}$ in the optical drive apparatus according to a modification of the embodiment of the present invention.

FIG. 12 is a graph showing temporal changes of the signals $V_1$, NR, and $V_{out}$ when performing a reproduction of a disk while maintaining vicinity of the center of the track, plotted with the temporal change of the tracking error signal $TE_{DPP}$ with an assumption that the determining unit 63 performs the aforementioned processes. In this example, as shown in FIG. 12, the value of the output signal $V_{out}$ is once set to high upon the focal point of the optical beam coming into a non-recorded area, and then maintained to a high state while it is in the non-recorded area. Therefore, because the frequency of switching the DPD mode and the DPP mode can be considerably reduced, it is possible to perform the tracking servo in a more stable manner.

The equation (1) for calculating the differential push-pull signal DPP by the optical detector 5 and the processing unit 6 according to the above embodiments is the most basic kind of equation. In an actual case, particularly when the optical disk 11 is a multilayer disk, a light receiving area for receiving a stray light is provided on the light receiving surface of the optical detector 5 as a measure against the stray light, and the differential push-pull signal DPP can be also generated based on a light receiving amount of the light receiving area. With this configuration, it is possible to reduce an offset that is generated in the tracking error signal $TE_{DPP}$ due to the stray light.

Furthermore, when using only a multilayer disk having a land and a groove as the optical disk 11, it also suffices that the tracking servo unit 62 controls the optical system 3 based on the tracking error signal $TE_{DPD}$ constantly in a recorded area. With this configuration, because the DPD method is used instead of the DPP method in a tracking servo for the multilayer disk having the land and the groove, a complicated measure against the stray light is not required.

What is claimed is:

1. An optical drive apparatus configured to read recorded information on an optical disk having a land and a groove, the optical drive apparatus comprising:
    an optical system configured to irradiate a recording surface of the optical disk with an optical beam;
    an optical detector configured to receive a reflected light of the optical beam reflected from the recording surface;
    a first tracking-error-signal generating unit configured to generate a first tracking error signal by using a DPD method, based on a light receiving amount of the optical detector;
    a second tracking-error-signal generating unit configured to generate a second tracking error signal by using a DPP method, based on the light receiving amount of the optical detector;
    a tracking servo unit configured to control the optical system based on either one of the first and second tracking error signals; and
    a determining unit configured to determine that an irradiation point of the optical beam is in a non-recorded area, wherein the tracking servo unit is configured to start a control of the optical system based on the first tracking error signal to achieve an on-track state, the recorded information being continuously read from the optical disk during the on-track state, and
    after the on-track state is achieved based on the first tracking error signal but the determining unit determines that the irradiation point of the optical beam is in a non-recorded area, the tracking servo unit is configured to switch over to a control of the optical system based on the second tracking error signal from the control of the optical system based on the first tracking error signal.

2. The optical drive apparatus as claimed in claim 1, wherein the determining unit determines that an irradiation point of the optical beam is in a non-recorded area in response to whether the second tracking error signal changes beyond a first predetermined range.

3. The optical drive apparatus as claimed in claim 2, the tracking servo unit switches over to a control based on the second tracking error signal when the determining unit determines that an irradiation point of the optical beam is in the non-recorded area during performing a control based on the first tracking error signal, and switches over to the control based on the first tracking error signal in response to whether the second tracking error signal is within a second predetermined range that is narrower than the first predetermined range during performing the control based on the second tracking error signal.

4. The optical drive apparatus as claimed in claim 2, further comprising an RF signal generating unit that generates an RF signal based on the light receiving amount of the optical detector, wherein
    the determining unit determines that an irradiation point of the optical beam is in a recorded area based on the RF signal, and the tracking servo unit switches over to a control based on the second tracking error signal when the determining unit determines that the irradiation point of the optical beam is in the non-recorded area during performing a control based on the first tracking error signal, and switches over to the control based on the first tracking error signal when the determining unit determines that the irradiation point of the optical beam is in the recorded area during performing the control based on the second tracking error signal.

5. The optical drive apparatus as claimed in claim 1, further comprising an RF signal generating unit that generates an RF signal based on a light receiving amount of the optical detector, wherein the determining unit determines that an irradiation point of the optical beam is in a non-recorded area based on the RF signal.

6. The optical drive apparatus as claimed in claim 5, wherein the determining unit determines whether an irradiation point of the optical beam is in a non-recorded area or a recorded area based on the RF signal, and the tracking servo unit switches over to a control based on the second tracking error signal when the determining unit determines that the irradiation point of the optical beam is in the non-recorded area during performing a control based on the first tracking error signal, and switches over to the control based on the first tracking error signal when the determining unit determines that the irradiation point of the optical beam is in the recorded area during performing the control based on the second tracking error signal.

7. The optical drive apparatus as claimed in claim 1, wherein when the determining unit determines that the irradiation point of the optical beam is in a recorded area, the tracking servo unit switches over to the control of the optical system based on the first tracking error signal from the control of the optical system based on the second tracking error signal.

* * * * *